United States Patent
Do et al.

(10) Patent No.: US 12,149,836 B2
(45) Date of Patent: Nov. 19, 2024

(54) ELECTRONIC DEVICE FOR IMPROVING IMAGE QUALITY

(71) Applicant: Samsung Electronics Co., Ltd., Gyeonggi-do (KR)

(72) Inventors: Wonjoon Do, Gyeonggi-do (KR); Woojhon Choi, Gyeonggi-do (KR); Jaesung Choi, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 177 days.

(21) Appl. No.: 18/070,771

(22) Filed: Nov. 29, 2022

(65) Prior Publication Data
US 2023/0137831 A1 May 4, 2023

Related U.S. Application Data

(63) Continuation of application No. PCT/KR2022/016359, filed on Oct. 25, 2022.

(30) Foreign Application Priority Data

Nov. 3, 2021 (KR) .......................... 10-2021-0150080
Dec. 23, 2021 (KR) .......................... 10-2021-0186409

(51) Int. Cl.
*H04N 23/81* (2023.01)
*H04N 23/71* (2023.01)
*H04N 23/76* (2023.01)

(52) U.S. Cl.
CPC ............ *H04N 23/81* (2023.01); *H04N 23/71* (2023.01); *H04N 23/76* (2023.01)

(58) Field of Classification Search
CPC ........ H04N 23/81; H04N 23/71; H04N 23/76; H04N 25/61; H04N 23/617
See application file for complete search history.

(56) References Cited

U.S. PATENT DOCUMENTS 9,762,870 B2 * 9/2017 Yamaguchi ............ G09G 3/003
10,154,208 B2 * 12/2018 Ishihara ............... H04N 23/843
(Continued)

FOREIGN PATENT DOCUMENTS

CN 110460825 A 11/2019
CN 113139911 A 7/2021
(Continued)

OTHER PUBLICATIONS

Ruicheng Feng etc., 'Removing Diffraction Image Artifacts in Under-Display Camera via Dynamic Skip Connection Network', 2021 IEEE/CVF Conference on Computer Vision and Pattern Recognition (CVPR), pp. 662-671, Jun. 20-25, 2021 pp. 662-663, 665, 669; drawings 1, 5.

(Continued)

*Primary Examiner* — Padma Haliyur
(74) *Attorney, Agent, or Firm* — Cha & Reiter, LLC

(57) ABSTRACT

An electronic device may include: a camera; a display positioned between an object to be photographed by the camera and the camera; a processor connected to the camera and the display; and a memory operatively connected to the processor, wherein the memory stores instructions that, when executed, cause the processor to: receive an original image from the camera; input the original image as an input value to an artificial intelligence model trained for improving image quality, and obtain a correction image from a result value output from the artificial intelligent model; detect a saturated area in which a light source is depicted in the correction image; and obtain a compensation image by blurring a boundary between the saturated area and a periphery thereof in the correction image by using the original image.

20 Claims, 16 Drawing Sheets

(56) References Cited

U.S. PATENT DOCUMENTS

| | | |
|---|---|---|
| 10,382,712 B1 | 8/2019 | Forutanpour et al. |
| 10,510,136 B2 * | 12/2019 | Zhang ................. G06T 5/70 |
| 10,785,409 B2 | 9/2020 | Jang |
| 10,957,022 B2 | 3/2021 | Kim et al. |
| 2012/0287307 A1 | 11/2012 | Oyama |
| 2013/0286253 A1 | 10/2013 | Moon et al. |
| 2015/0256760 A1 | 9/2015 | Ju et al. |
| 2017/0359534 A1 | 12/2017 | Li et al. |
| 2018/0098001 A1 * | 4/2018 | Park ................. H04N 23/80 |
| 2018/0137606 A1 * | 5/2018 | Zhang ................. G06T 7/13 |
| 2019/0268535 A1 | 8/2019 | Jinno |
| 2020/0273152 A1 * | 8/2020 | Lin ................. G06T 5/20 |
| 2022/0159162 A1 | 5/2022 | Sun et al. |
| 2022/0353401 A1 | 11/2022 | Do et al. |
| 2022/0366539 A1 * | 11/2022 | Lee ................. G06T 5/00 |
| 2023/0230204 A1 | 7/2023 | Xu et al. |

FOREIGN PATENT DOCUMENTS

| | | |
|---|---|---|
| EP | 4102810 A1 | 12/2022 |
| KR | 10-1532090 B1 | 6/2015 |
| KR | 10-2020-0101800 A | 8/2020 |
| KR | 10-2171387 B1 | 10/2020 |
| KR | 10-2021-0099822 A | 8/2021 |
| KR | 10-2287043 B1 | 8/2021 |
| KR | 10-2318013 B1 | 10/2021 |
| WO | 2022/025413 A1 | 2/2022 |
| WO | 2022/119372 A1 | 6/2022 |

OTHER PUBLICATIONS

YouTube, 'Galaxy Z fold 3 Under Display Camera closeup!!', https://www.youtube.com/watch?v=aUW7OvMRkt4.

International Search Report dated Jan. 31, 2023, For International Application No. PCT/KR2022/016359.

* cited by examiner

ELECTRONIC DEVICE FOR IMPROVING IMAGE QUALITY

CROSS-REFERENCE TO RELATED APPLICATION(S)

This application is a continuation of International Application No. PCT/KR2022/016359, which was filed on Oct. 25, 2022, and claims priority to Korean Patent Applications No. 10-2021-0150080 filed on Nov. 3, 2021 and No. 10-2021-0186409 filed on Dec. 23, 2021, in the Korean Intellectual Property Office, the disclosure of which are incorporated by reference herein their entirety.

BACKGROUND

1. Technical Field

Various embodiments relate to an image processing technology using a machine learning-based artificial intelligence model to improve image quality.

2. Background Art

An under-display camera (UDC) may refer to a camera which is disposed under a display and receives light through the display. Due to an obstacle corresponding to the display, a subject may be distortedly shown in an image captured by the UDC. For example, light diffraction may occur due to a microstructure in which pixels and wires of the display are repeated. Due to such diffraction, image quality deterioration such as a phenomenon in which two overlapping images are shown, deterioration in sharpness, or deterioration in a signal to noise ratio (SNR) may occur.

A UDC image can be processed by using a machine learning (e.g., deep learning built upon artificial neural networks)-based artificial intelligence model, so that the quality of the image can be improved.

A machine learning-based artificial intelligence model can be effective in image quality improvement. However, in a saturated area in which a light source exists in a UDC image, the image quality may not improve as much as an unsaturated area. For example, in the saturated area, information for correction may be insufficient, compared to the unsaturated area. Accordingly, an image improvement effect may be limited. A light source may include a light source (hereinafter, referred to as a direct light source) from which light is directly emitted, and/or a reflector (hereinafter, referred to as an indirect light source) which receives light from the direct light source and reflects the light. The direct light source may include the sun and/or an artificial light source (e.g., an incandescent lamp and a fluorescent lamp). An indirect light source may include the moon, the clouds, white clothes, a white mask, or a glass window which reflects sunlight. For example, a glare pattern, which is so-called "flare", caused by glare due to diffraction, may be generated around the saturated area. When a UDC image having the flare is processed (e.g., diffraction correction) by using an artificial intelligence model, an area around the saturated area may be even appear unnaturally, or artifacts may appear in the saturated area and/or around the saturated area.

certain embodiments of the disclosure may provide an electronic device which can process a UDC image so that an area around a saturated area can be shown naturally. According to certain embodiments of the disclosure, corrections to an area around a saturated area may improve.

The technical problems to be solved in the disclosure are not limited to the above-described technical problems, and other technical problems that are not mentioned can be clearly understood from the description below by those skilled in the art to which the disclosure belongs.

SUMMARY

In certain embodiments, an electronic device may include: a camera; a display positioned between an object to be photographed by the camera and the camera; a processor connected to the camera and the display; and a memory operatively connected to the processor, wherein the memory stores instructions that, when executed, cause the processor to: receive an original image from the camera; input the original image as an input value to an artificial intelligence model trained for improving image quality, and obtain a correction image from a result value output from the artificial intelligent model; detect a saturated area in which a light source is depicted in the correction image; and obtain a compensation image by blurring a boundary between the saturated area and a periphery thereof in the correction image by using the original image.

In certain embodiments, an electronic device may include a camera and a display positioned between an object to be photographed by the camera and the camera. A method for operating such an electronic device may include: receiving an original image from the camera; inputting the original image as an input value to an artificial intelligence model trained for improving image quality and obtaining a correction image from a result value output from the artificial intelligence model; detecting a saturated area where a light source is depicted in the correction image; and obtaining a compensation image by blurring a boundary between the saturated area and a periphery thereof in the correction image by using the original image.

According to certain embodiments, an electronic device performs processing so that an area around a saturated area in an image acquired by using a UDC can be shown naturally. Various other effects directly or indirectly identified through the document can be provided.

DETAILED DESCRIPTION

Figure 1:
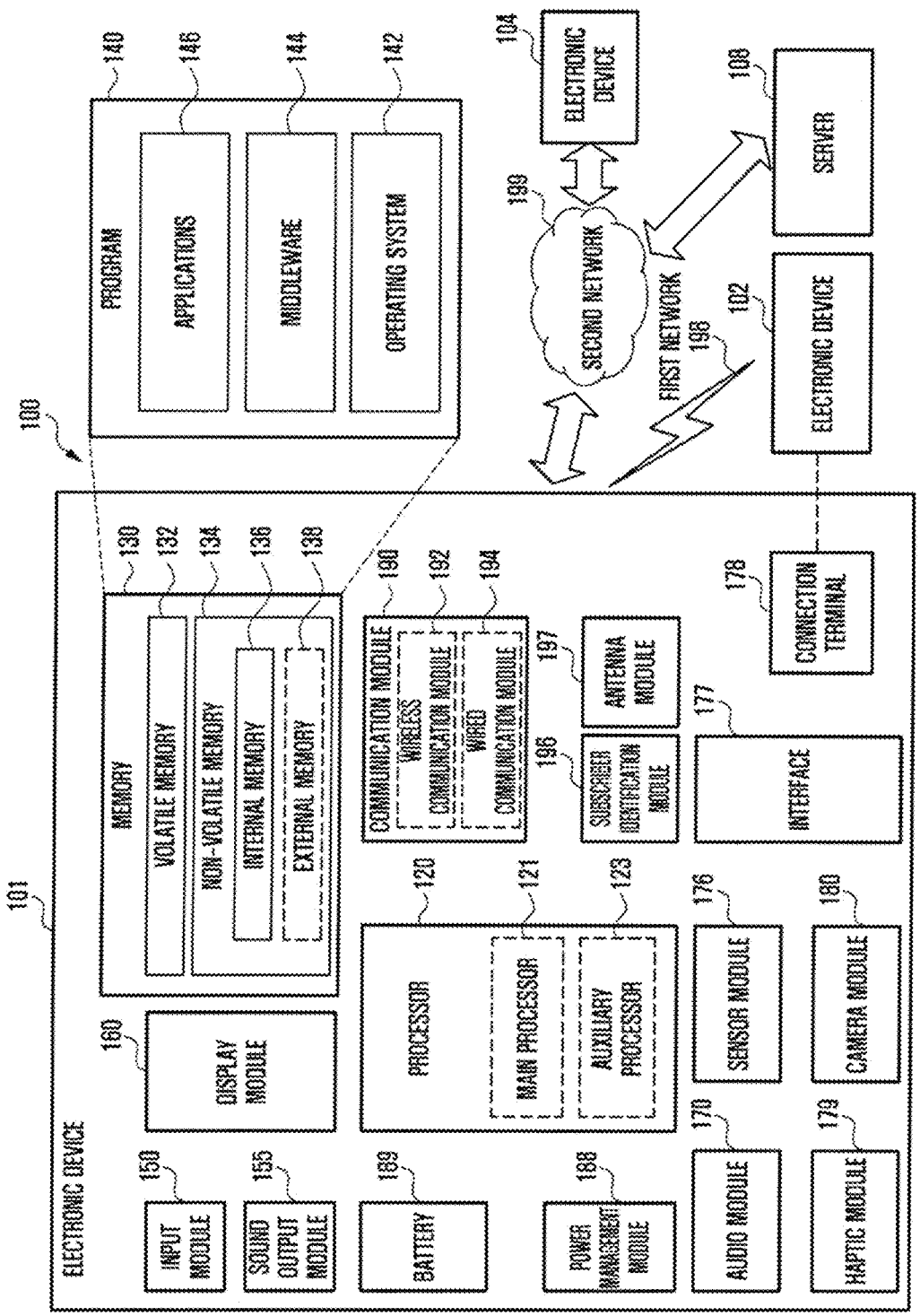
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121. The term "processor" shall be understood to refer to both the singular and plural contexts.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
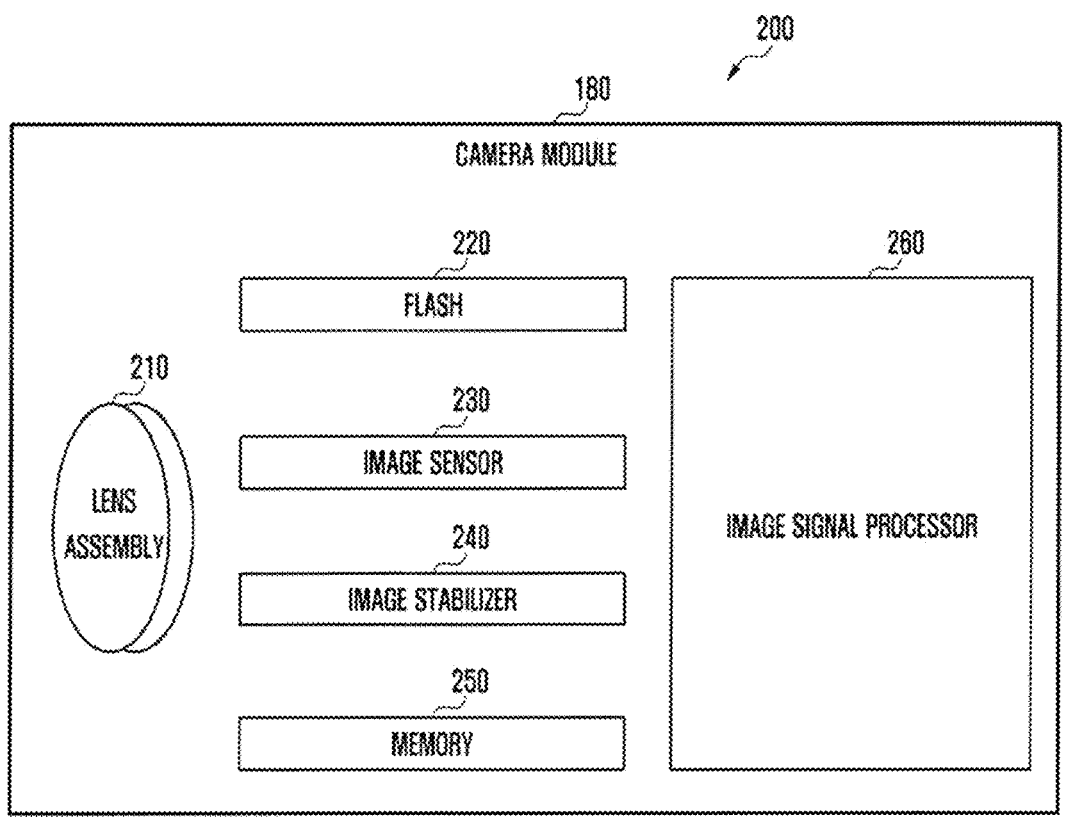
FIG. 2 is a block diagram illustrating a camera module according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260.

The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In certain embodiments, the camera module 180 may be disposed under the display module 160. That is, the camera module 180 can be disposed in the housing under the display module 160, such that the camera module 180 receives light that passes through the display module 160.

Figure 3A:
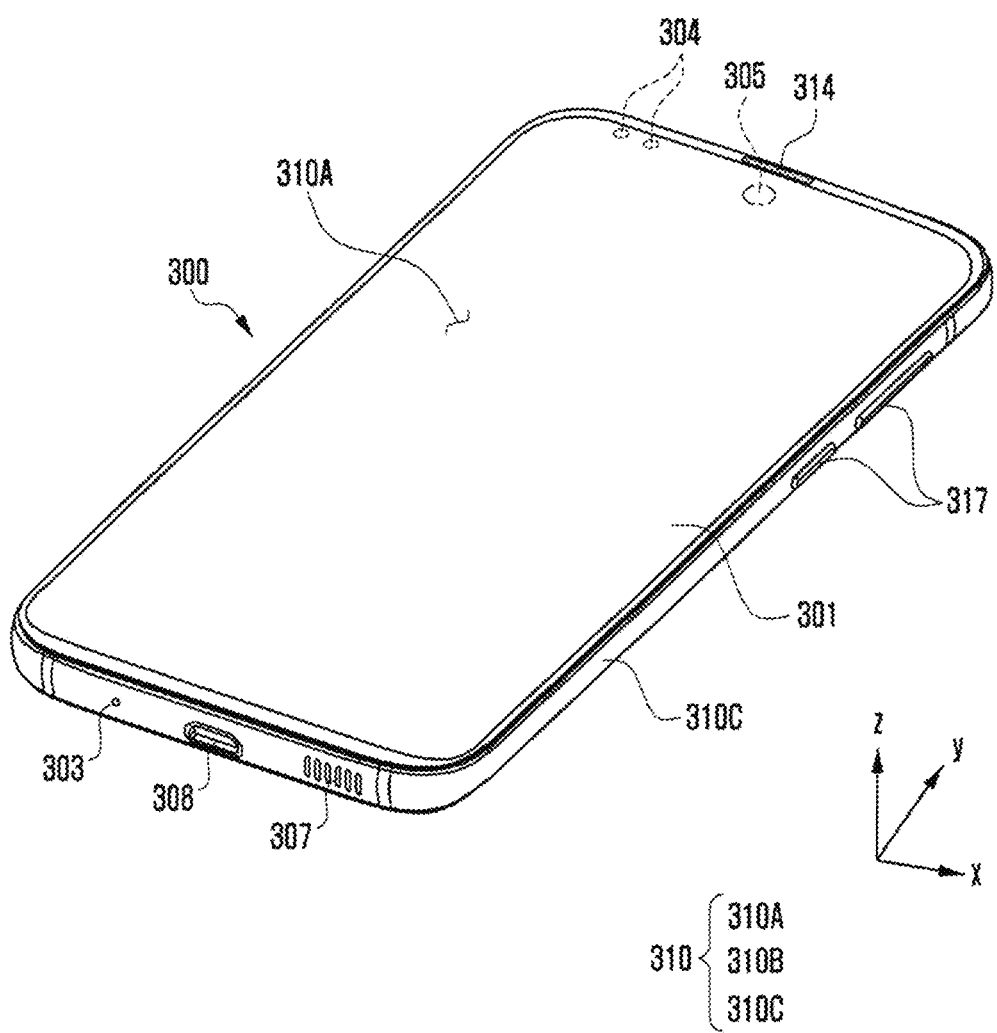
FIG. 3A is a front perspective view illustrating an electronic device having a bar-type housing structure according to an embodiment.
Figure 3B:
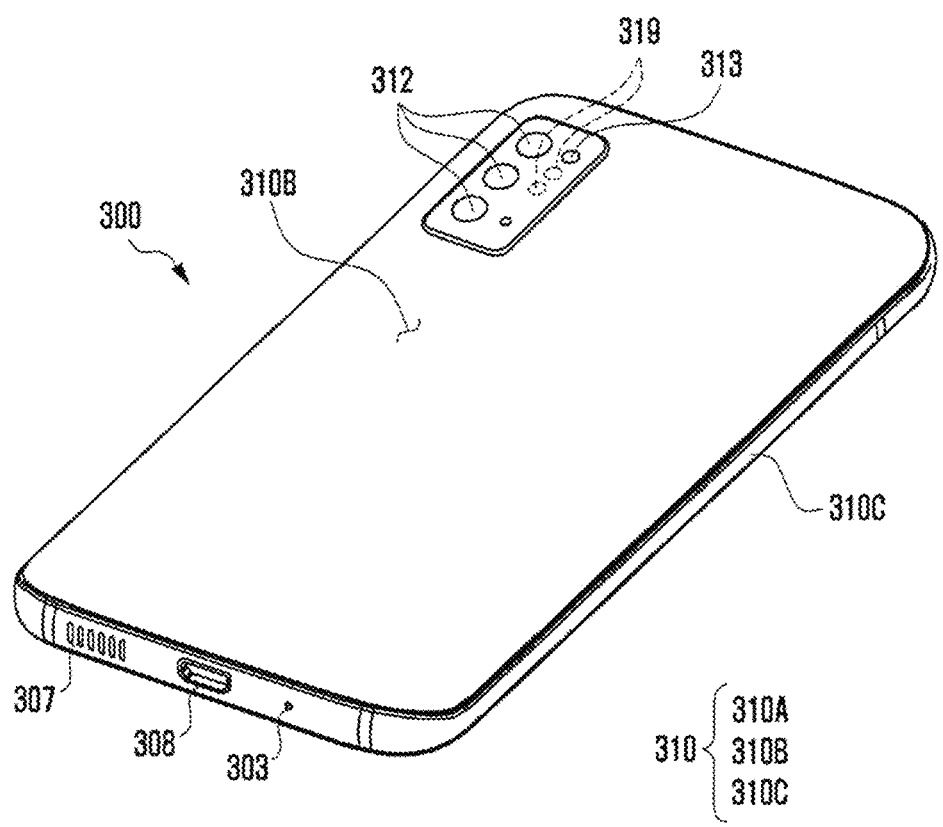
FIG. 3B is a rear perspective view of the electronic device in FIG. 3A.

FIGS. 3A and 3B describe an electronic device 300 with a camera module 305 that is under a display 301 in the housing.

FIG. 3A is a front perspective view illustrating an electronic device 300 having a bar-type housing structure according to an embodiment. FIG. 3B is a rear perspective view of the electronic device 300 in FIG. 3A.

Referring to FIG. 3A and FIG. 3B, a housing 310 of the electronic device 300 (e.g., the electronic device 101 in FIG. 1) according to an embodiment may include a first surface (or a front surface) 310A, a second surface (or a rear surface) 310B, and a lateral surface 310C surrounding a space between the first surface 310A and the second surface 310B. According to an embodiment, at least a portion of the first surface 310A may include a substantially transparent front plate (e.g., a glass plate including various coating layers or polymer plate) (or a front cover). The second surface 310B may include a substantially opaque rear plate (or, a rear cover). The lateral surface 310C may be coupled to the front plate and the rear plate and may include a lateral bezel structure (or a lateral member) including a metal and/or polymer.

According to an embodiment, the electronic device 300 may include at least one of a display 301, a microphone hole 303, a speaker hole 307, 314, a sensor module 304, 319, a camera module 305, 312, 313, a key input device 317, and a connector 308. In an embodiment, the electronic device 300 may omit one of components (e.g., the key input device 317) or may additionally include another component.

The display 301 (e.g., the display module 160 in FIG. 1) may be exposed through the first surface 310A. The display 301 may be combined to or disposed under a touch sensing circuit, a pressure sensor for measuring a strength (pressure) of a touch, and/or a digitizer for detecting a magnetic field-type stylus pen.

Hereinafter, a surface on which the display 301 (e.g., a main display) is disposed may be defined as a front surface of the electronic device 300 and a surface opposite to the front surface may be defined as a rear surface of the electronic device 300 herein. In an embodiment, an additional display (e.g., an auxiliary display) may be disposed on the rear surface. Accordingly, a display disposed on the front surface may be referred to as a front display and a display disposed on the rear surface may be referred to as a rear display.

In an electronic device (e.g., a smartphone), the "front side" can be considered the side that makes contact with the user's cheek, when the user is engaged in a telephone call. The "top" can be considered the location of the speaker that provides the other parties voice, and the "bottom" can be considered the location where the microphone that receives the user's voice during a phone call.

The electronic device (e.g., the electronic device 101 in FIG. 1) may include a foldable housing structure other than the bar-type housing structure. The foldable housing structure may be divided into two housings around a folding axis. A first portion of the front display (e.g., the flexible display) may be disposed on a front surface of a first housing and a second portion of the display may be disposed on a front surface of a second housing. The foldable housing structure may be implemented in an in-folding scheme in which the first portion and the second portion of the front display face each other in a state in which the electronic device is folded. Alternatively, the foldable housing structure may be implemented in an out-folding scheme in which the first portion and the second portion of the front display face opposite directions in a state in which the electronic device is folded. A second display may be disposed on the rear surface of the first housing and/or the rear surface of the second housing. In another example, the electronic device may have a slidable housing structure. For example, the electronic device may include a housing, a slider part, a roller configured to allow a portion of the housing and the slider part to be inserted into or withdrawn from the housing, and a flexible display (e.g., the front display).

The sensor module 304 and 319 (e.g., the sensor module 176 in FIG. 1) may generate an electrical signal or data in response to an internal operation state or external environment state of the electronic device 300. In an embodiment, the sensor module 304, 319 may include a first sensor module 304 (e.g., a light sensor and/or a fingerprint sensor) disposed on the first surface 310A and/or a second sensor module 319 (e.g., a light sensor and/or a hear rate monitoring (HRM) sensor) disposed on the second surface 310B. The first sensor module 304 may be disposed under the display 301 when the display 301 is viewed from above the first surface 310A.

In an embodiment, the light sensor may include a combination of a filter and a photo diode. The filter may filter a light component in a designated frequency band from light incident to the filter through the front cover. The photo diode, paired with the filter, may respond to the light component passing through the filter. For example, the photo diode may generate an electrical signal (e.g., a current) corresponding to the light component passing through the filter. An analog to digital converter (ADC) (not shown) may convert the electrical signal generated from the photo diode into a digital signal so as to transmit the digital signal to the processor 120. For example, the digital signal may be stored in a buffer before being transferred to the processor 120. The digital signal may be transferred to the processor 120 through the buffer in a first in first out (FIFO) method in which data input first is output first. For example, when light intensity is strong, data having a large value may be output from the ADC to the processor 120 through the buffer. When a light intensity is relatively weak, data having a small value may be output from the ADC to the processor 120 through the buffer.

In an embodiment, the light sensor may include a light recognition sensor (e.g., an ambient light sensor (ALS) and a flicker sensor) for recognizing a type of a light source (e.g., an artificial light source or the sun) and/or an illuminance sensor for measuring illuminance around the electronic device 400. Intensities of infrared light (a light component having a frequency band of about 700-1100 nm) may vary according to types of light sources. For example, the infrared light of a fluorescent light may have an intensity relatively weaker than that of sunlight. The infrared light of an incandescent light may have an intensity relatively stronger than that of sunlight. Accordingly, the light recognition sensor may include a combination of a filter capable of obtaining an intensity of infrared light and a photo diode. In an embodiment, the light recognition sensor may include a combination of a filter (hereinafter, a wideband filter) for filtering light (e.g., a light component having a frequency band of about 300-1100 nm) of a spectrum including visible light (a light component having a frequency band of about 400-700 nm) and infrared light, and a photo diode responding to light passing through the wideband filter, and a combination of a visible light filter and a photo diode responding to visible light. In an embodiment, the light recognition sensor may include an infrared filter and a photo diode responding to infrared light. Human eyes may respond most sensitively to G among red (R), green (G), and blue (B). Accordingly, the illuminance sensor may include a combination of a filter for filtering green light (about 450-650 nm) and a photo diode responding to green. The processor 120 may recognize a type of a light source (e.g., an artificial light source (e.g., a streetlight and a fluorescent light) and the sun) emitting light to the front camera 305 and calculate an intensity of the light when the front camera 305 operates (e.g., to generate an image), based on data received from the light sensor through the ADC. The processor 120 may determine whether the electronic device 400 is located outdoors or indoors, based on the identified type of the light source.

In an embodiment, the light sensor may include a proximity sensor for recognizing an object approaching the electronic device 400 and calculating a distance between the electronic device 400 and the object adjacent to the electronic device.

The camera module 305, 312, and 313 (e.g., the camera module 180 in FIG. 1) may include a first camera 305 disposed on the first surface 310A, a second camera device 312 disposed on the second surface 310B, and a flash 313. The camera modules 305 and 312 may include lens assembly (including one or more lenses), an image sensor, and/or an image signal processor. The flash 313 may include, for example, a light-emitting diode or a xenon lamp. In an embodiment, two or more lenses (e.g., a wide-angle lens, a super-wide-angle lens, or a telephoto lens) and image sensors may be arranged on one surface of the electronic device 300. In an embodiment, the front camera 305 may be a under-display camera (UDC) disposed under the display 301 when the display 301 is viewed from above the first surface 310A and receiving light through the display 301. By disposing the front camera 305 inside the electronic device 300, it is possible to implement an area in which the front camera 305 is disposed as a display area. As such, a display having an interrupted shape (e.g., a shape having no area where a screen is not displayed in a middle area of the display 301) may be implemented on one surface of the electronic device 300 for the display area of the maximum size, without having to implement the display 301 to have a notch shape or dispose the front camera 305 to be exposed through a portion of the middle area of the display 301. Substantially, the entirety of the front surface may be the display area.

In the display 301, a hole (e.g., a punch hole) (or an opening) may be formed at a portion facing the front camera 305. For example, the display 301 may be formed of multiple layers (e.g., a polarizing film, a display panel, and a subsidiary material layer (e.g., a light blocking layer to block light generated by a display panel or light incident to a display panel from outside, a heat dissipation sheet, and sponge)), and a through-hole may be formed through the layers except at least one layer (e.g., a display panel) in the display 301. For another example, a through-hole (e.g., a punch hole) may be formed through all layers. At least a portion (e.g., a lens) of the front camera 305 may be disposed inside a hole penetrating through the display 301. In an embodiment, multiple front cameras may be arranged under the display 301 (not shown). An electronic device (for example, the electronic device 101 in FIG. 1) may include a rear display. Accordingly, an UDC for receiving light through the rear display may be additionally disposed under the rear display.

When the front camera 305 is disposed below the display 301, the light passes through the pixels and conductors that connect the pixels and reaches the front camera 305. This can cause various distortions in the captured image. In certain embodiments, artificial intelligence can be used to correct the image. Moreover, in certain embodiments, correction of images in saturated areas, or areas surrounding saturated areas, can be improved.

Figure 4:
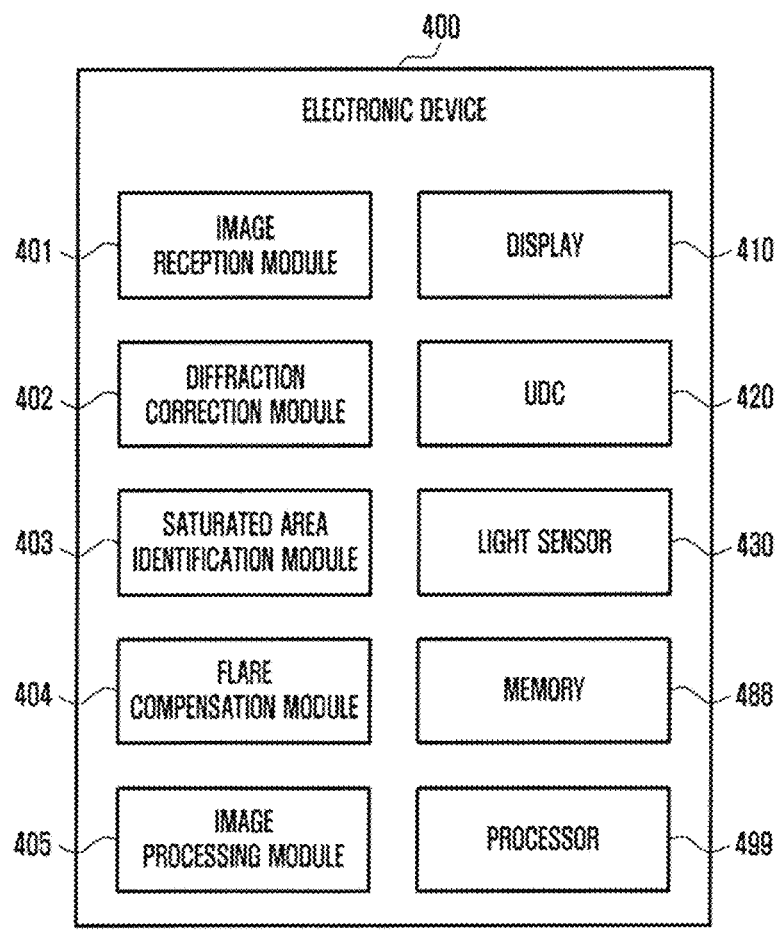
FIG. 4 is a block diagram illustrating an electronic device configured to improve image quality according to certain embodiments.
Figure 5:
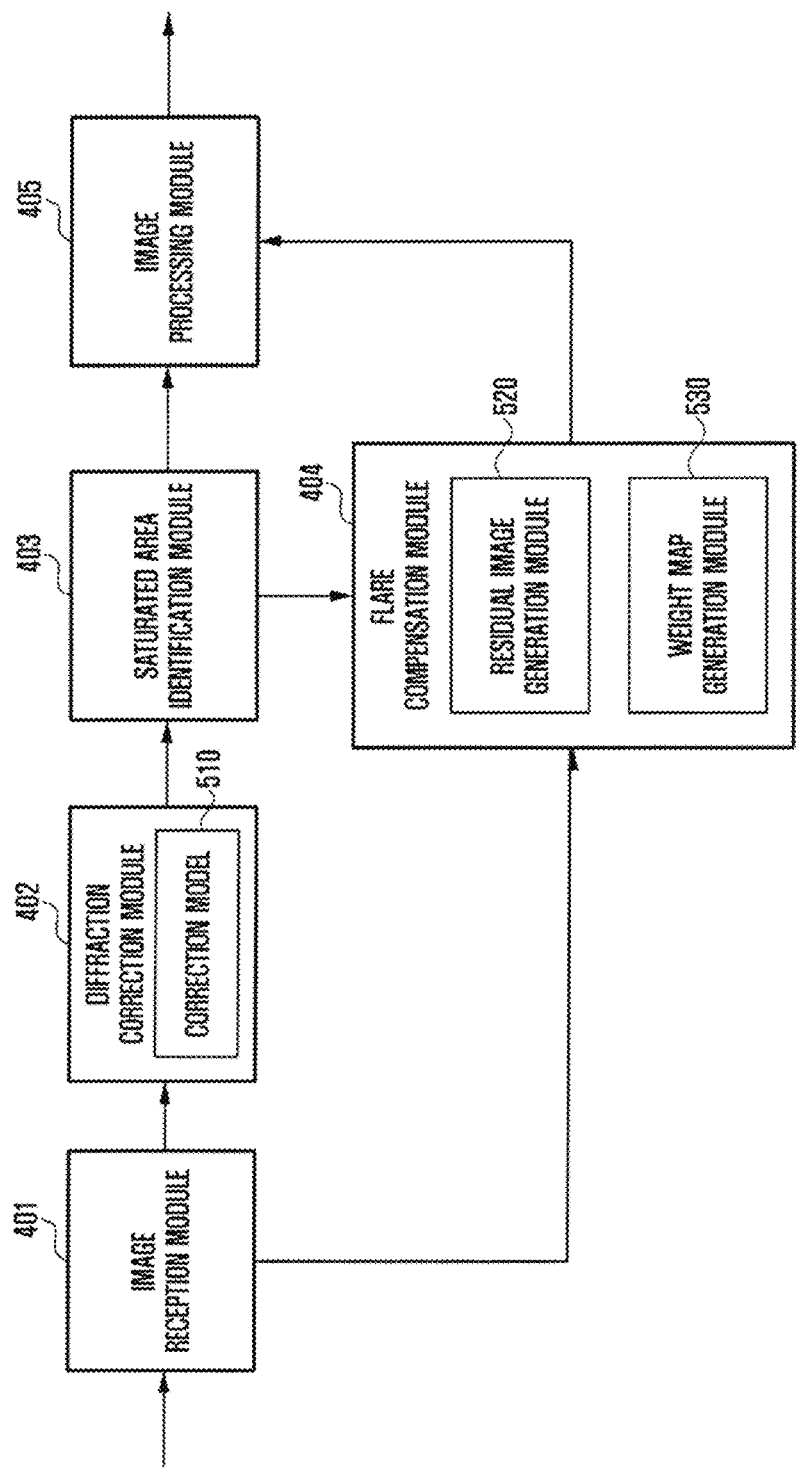
FIG. 5 is a diagram illustrating connection between modules in FIG. 4 according to an embodiment.

FIG. 4 describes an electronic device 400 with a display 410 and a camera 420 under the display (Under Display Camera UDC). As shown in FIG. 5, when an image is captured by an image reception module 401, a diffraction correction module 401 may correct diffraction resulting light passing through the display 410. A saturation area identification module 403 may identify an area that is saturated in the corrected image and provide the saturated area from the corrected image to a flare compensation module 404. The flare compensation module 404 may use the image received from the image reception module 401, and correct the saturated area from the corrected image.

Figure 6A:
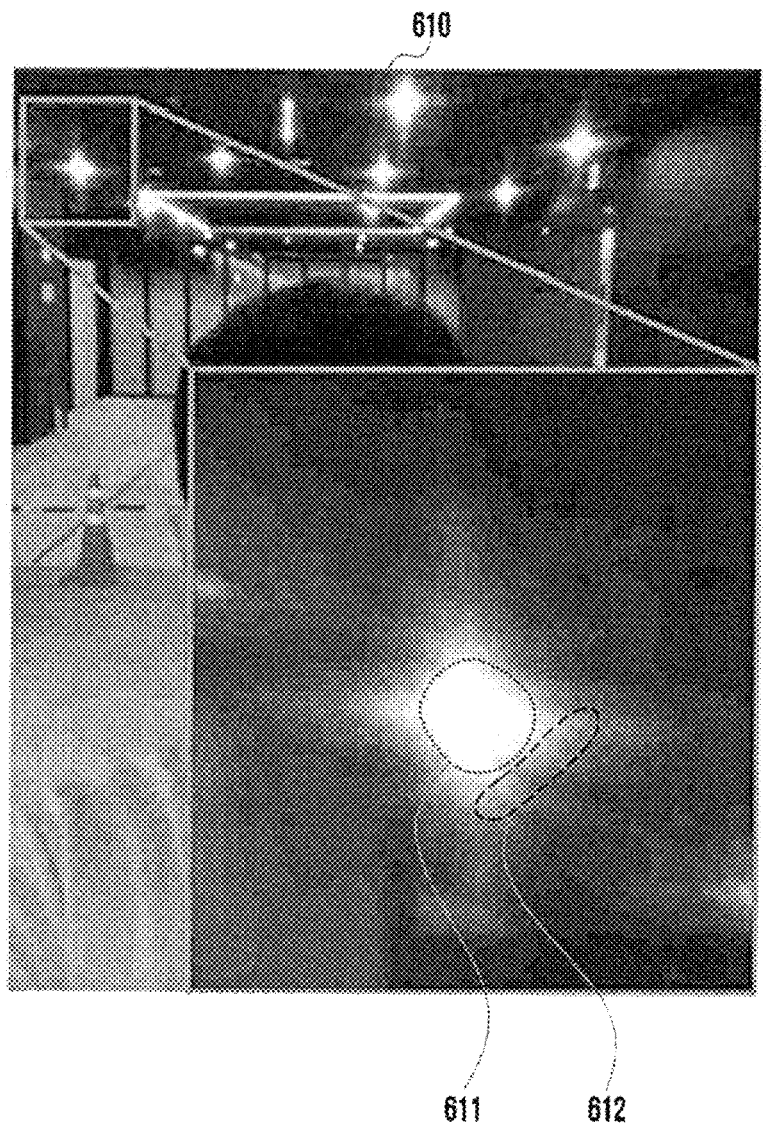
FIG. 6A and FIG. 6B are views illustrating original images generated from a UDC in FIG. 4.
Figure 6B:
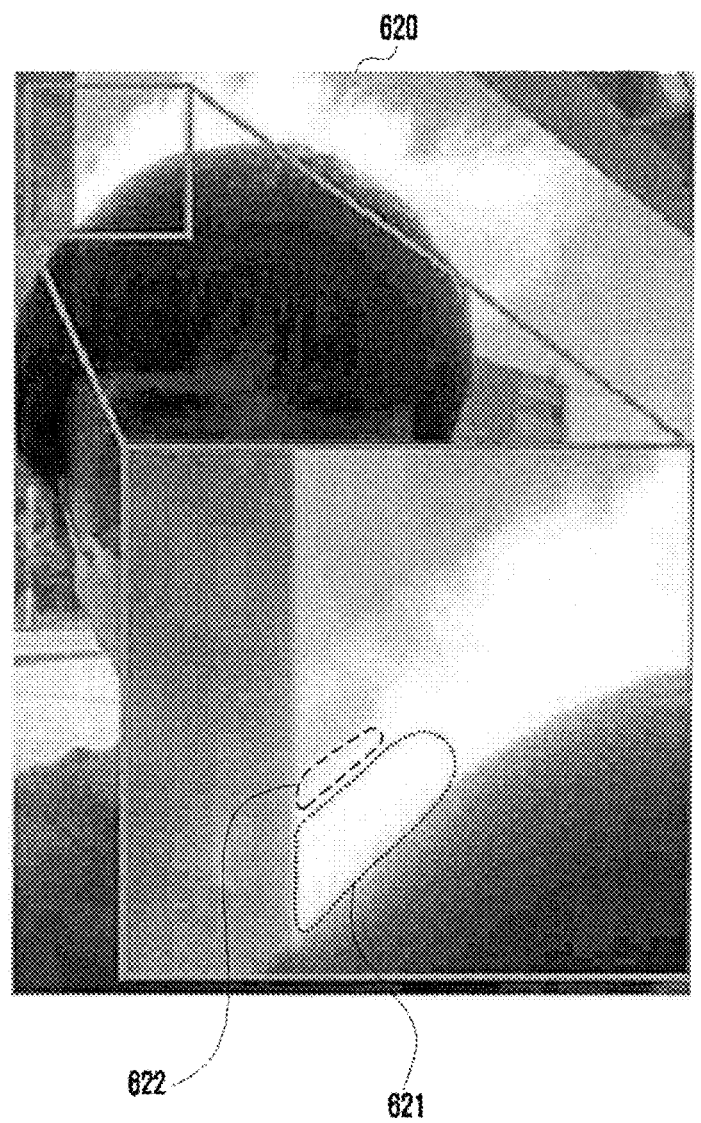
Figure 7A:
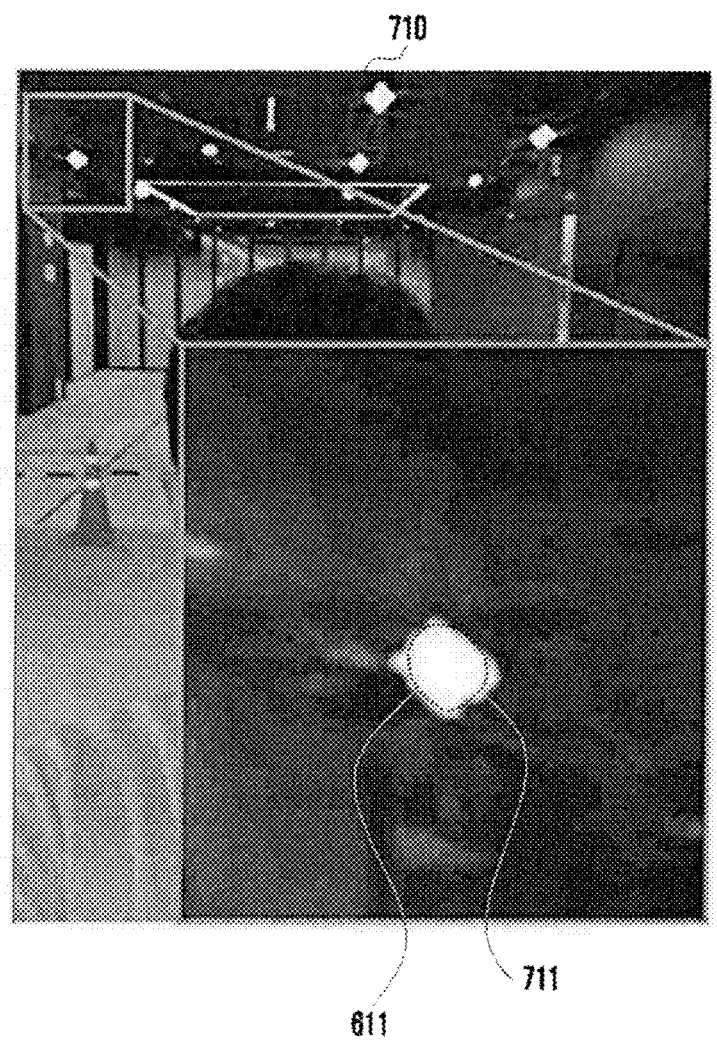
FIG. 7A and FIG. 7B are views illustrating images generated from a diffraction correction module in FIG. 4.
Figure 7B:
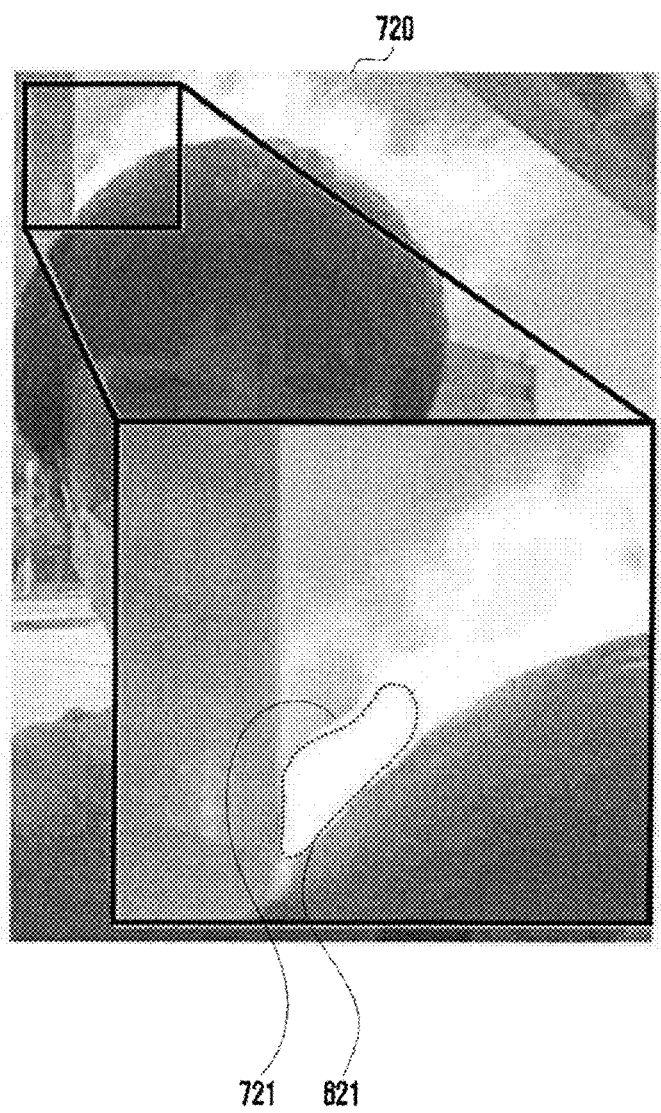
Figure 8A:
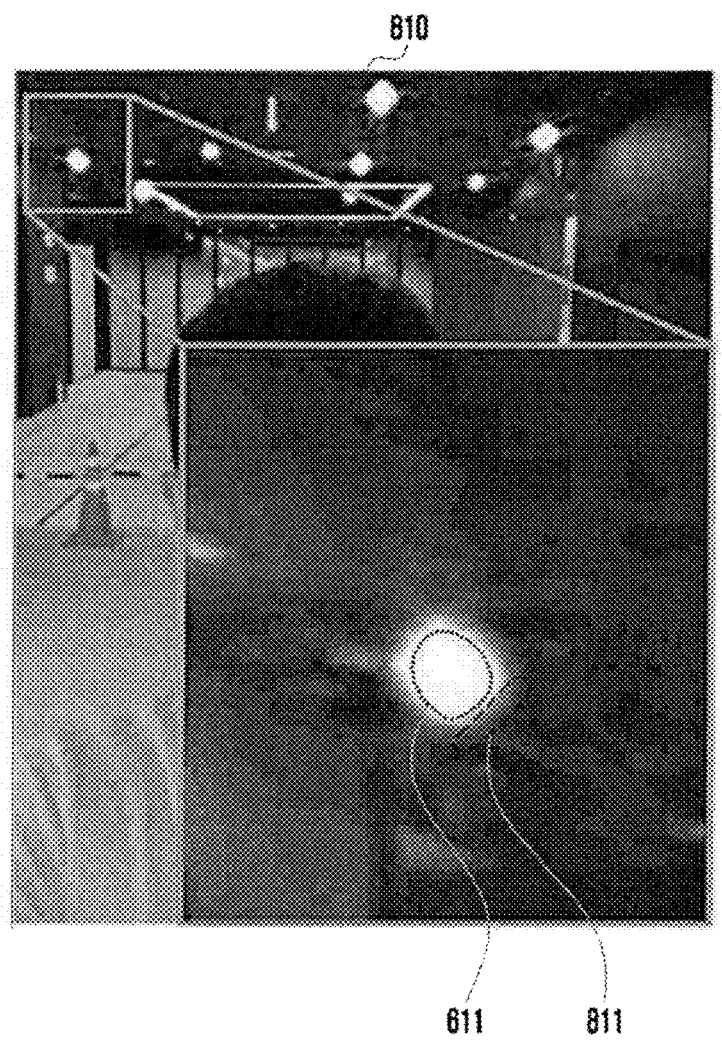
FIG. 8A and FIG. 8B are views illustrating images generated from a flare compensation module in FIG. 4.
Figure 8B:
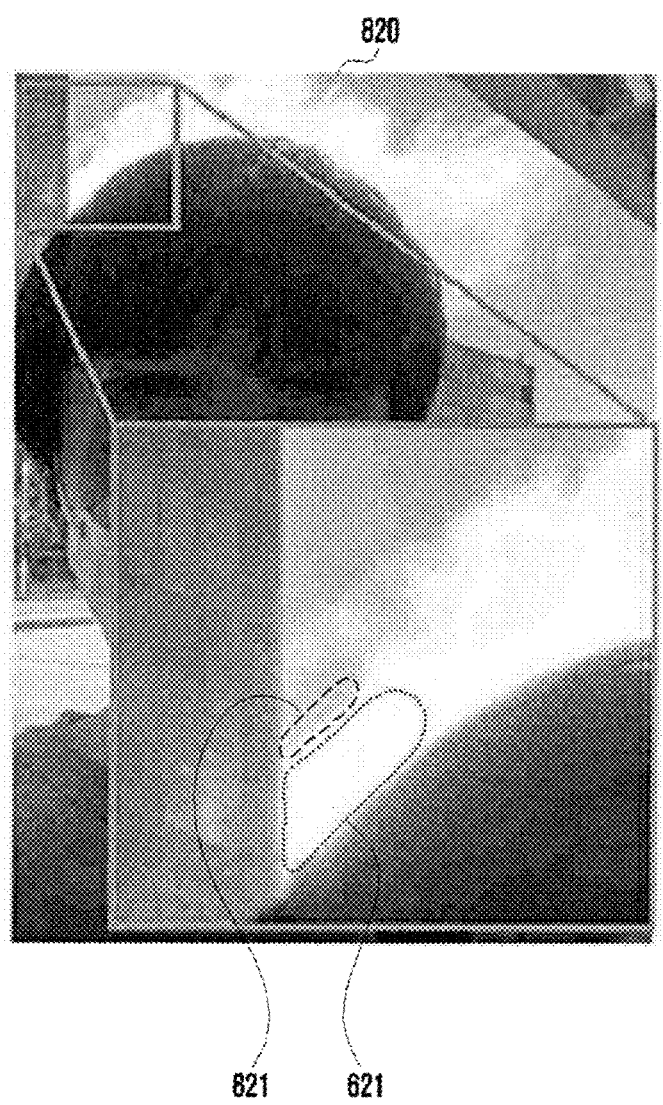
Figure 9A:
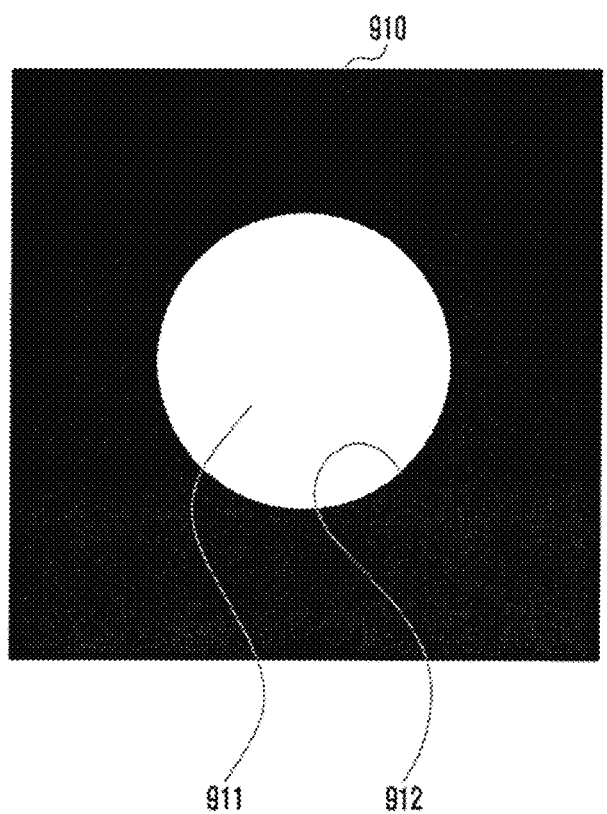
FIG. 9A and FIG. 9B are views illustrating images generated from a weight map generation module in FIG. 5.
Figure 9B:
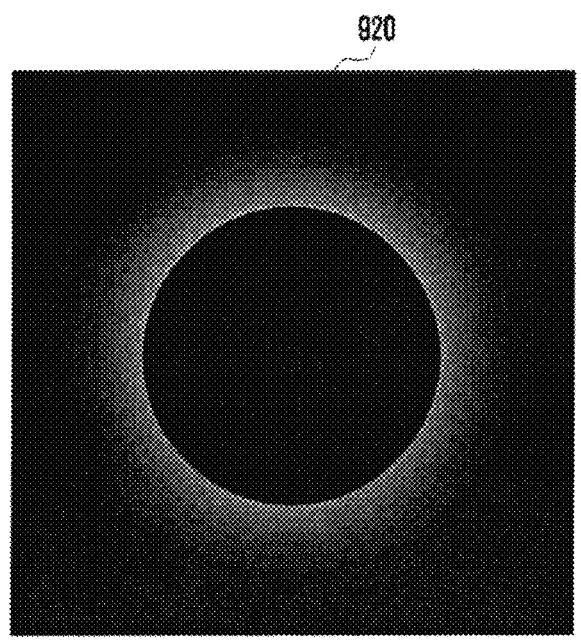

FIG. 4 is a block diagram 400 illustrating an electronic device configured to improve image quality according to certain embodiments. FIG. 5 is a diagram illustrating connection between modules 401-405 in FIG. 4 according to an embodiment. FIG. 6A and FIG. 6B are views illustrating original images 610, 620 generated from a UDC 420 in FIG. 4. FIG. 7A and FIG. 7B are views 710, 720 illustrating images generated from a diffraction correction module 402 in FIG. 4. FIG. 8A and FIG. 8B are views 810, 820 illustrating images generated from a flare compensation module 404 in FIG. 4. FIG. 9A and FIG. 9B are views illustrating images 910, 920 generated from a weight map generation module 404b in FIG. 5.

Referring to FIG. 4 and FIG. 5, the electronic device 400 (e.g., the electronic device 101 in FIG. 1) may include an image reception module 401, a diffraction correction module 402, a saturated area identification module 403, a flare compensation module 404, an image processing module 405, a display 410, a UDC 420, a light sensor 430, a memory 488, and a processor 499. The light sensor (e.g., a light recognition sensor and/or an illuminance sensor included in the first sensor 304 in FIG. 3A) 430 may be structurally included in the display 410.

The UDC 420 (e.g., the front camera 305 in FIG. 3A) may be disposed under the display 410 when the display 410 is viewed from front so as to generate an original image in response to external light having passed through the display 410. Diffraction phenomenon in which light is bent by the display 410 may cause picture quality deterioration. Image processing with respect to the original image for improving picture quality may be performed before image encoding. In certain embodiments, the components of the electronic device 400, which are configured to improve picture quality of the original image may be operatively or electrically connected to each other. According to an embodiment, the modules 401-405 may be operatively connected to each other as shown in FIG. 5. The modules 401-405 may be program modules executed in the processor 499 (e.g., the processor 120 in FIG. 1 or the image signal processor 260 in FIG. 2).

The image reception module 401 may receive the original image from the UDC 420. For example, the original image may be an image (e.g., Bayer pattern data and RGB data) output from the image sensor 230. For another example, the original image may be an image (e.g., a copy image having modified resolution) obtained by processing an image output from the image sensor 230 by a processor (e.g., the image signal processor 260).

The operation of electronic device 400 is described with reference to original images 610 and 620. Original image 610 (FIG. 6A) generally depicts a person inside a room with overhead lights (a direct light source). It can be seen that the overhead lights are saturated and create a starburst or a flare in that the lights appear to have rays emerging at from the top, left, right, and bottom. Original image 620 (FIG. 6B) shows a user outside in front of a building on a cloudy date. The cloud (an indirect light source) is saturated and is distorted.

Referring to FIG. 6A and FIG. 6B, a first original image 610 or a second original image 620 may be input to the image reception module 401. A first saturated area 611 in the first original image 610 may correspond to an artificial light source directly emitting light as shown in the drawing. As light of the lighting is emitted toward the front surface of the display 410 and diffracted by the display 410, a distinct first flare 612 may be formed around the first saturated area 611. A second saturated area 621 in the second original image 620 may correspond to a cloud which is a reflector for receiving light from the sun and reflecting the light as shown in the drawing. A second flare 622 relatively blurry (having reduced sharpness) compared to the first flare 612 caused by direct light of the lighting may be formed around the second saturated area 621.

The image reception module 401 may output the original image (e.g., the first original image 610 or the second original image 620) to the diffraction correction module 402 and output a copy of the original image to the flare compensation module 404.

The diffraction correction module 402 may process the original image received from the image reception module 401 to correct (remove the flare from the original image) the flare caused by diffraction. The diffraction correction module 402 may output the corrected image to the saturated area identification module 403.

According to an embodiment, the diffraction correction module 402 may include a correction model 510 (e.g., an artificial neural network) trained by using a first training image and a second training image paired therewith. The correction model 510 may include a model (e.g., a neural network and a support vector machine (SVM)) trained based on machine learning in advance. The diffraction correction module 402 may input, to the correction model 510, the original image received from the image reception module 401 as an input value and obtain the correction image from a result value output from the correction model 510.

According to an embodiment, the correction model 510 can be trained using undistorted image and distorted image pairs of the same object. By comparing the undistorted image and distorted image, the correction model 510 can learn how objects captured by a UDC are distorted.

According to an embodiment, an image generated by photographing an object by a camera (hereinafter, a general camera) which is disposed in the housing, has no display corresponds to an obstacle between the object and the camera, and has at least a portion (e.g., a lens) viewed from the outside may be obtained. The image obtained using the general camera may be used as the first training image. The general camera used to acquire the first training image may be, for example, the camera 312 of the electronic device 300 or a general camera of another electronic device. A UDC image may be obtained by photographing the same object by the UDC (420) of the electronic device or a UDC of another electronic device. The UDC image obtained thereby may be used as the second training image. The correction model 510 may perform its own learning for diffraction correction by using multiple pairs of training images generated by the method.

According to another embodiment, an image obtained by the general camera may be used as the first training image. The image obtained from the general camera can be distorted by a point spread function to which characteristics of the display are reflected so that defocused second training image corresponding to the UDC image may be obtained. For example, a virtual lighting with brightness that may cause flare or a high dynamic range (HDR) image (a virtually or actually photographed HDR image) may be added to the image obtained from the general camera. The second training image corresponding to the UDC image may obtained through a convolution operation between the image and the PSF.

Referring to FIG. 7A and FIG. 7B, the diffraction correction module 402 may process the first original image 610 and the second original image 620 to obtain a first correction image 710 and a second correction image 720. When compared with the original image 610, the first correction image 710 may show a clearer boundary 711 between the first saturated area 611 and a periphery thereof by overcorrection in which the first flare 612 around the lighting is removed from the original image. When compared with the original image 620, the second correction image 720 may also show a clearer boundary 721 between the second saturated area 621 and a periphery thereof as a periphery of the cloud is overly corrected. The overcorrection may make the correction image look rather unnatural than the original image. The unnaturalness around the saturated area may be improved through the flare compensation module 404. An image corrected by the diffraction correction module 402 may be output to the image processing module 405 through the saturated area identification module 403, or output to the flare compensation module 404.

The saturated area identification module 403 may identify a saturated area in which a light source exists from the correction image received from the diffraction correction module 402.

According to an embodiment, the saturated area identification module 403 may determine, as a saturated area, an area in the correction image, which may not be rendered brighter as the brightness reaches the maximum. For example, assuming that a range of RGB values of a pixel is 0-255, an average RGB value of the saturated area may be 255. In case that the correction image does not have a saturated area, the saturated area identification module 403 may output the corresponding correction image to the image processing module 405. The saturated area identification module 403 may output a correction image (e.g., the first correction image 710 or the second correction image 720) having a saturated area to the flare compensation module 404.

According to an embodiment, the saturated area identification module 403 may identify a saturated area in the correction image by using an artificial intelligence model (e.g., a neural network) trained to detect a saturated area in an image. For example, the saturated area identification module 403 may input a correction image to a trained artificial intelligence model as an input value and identify whether a saturated area exists from a result value output from the artificial intelligence model and a location of a saturated area from the correction image.

The saturated area identification module 403 may identify a type of a saturated area (or a light source) and output information indicating the type to the flare compensation module 404. The flare compensation module 404 may use identification information received from the saturated area identification module 403 to reduce unnaturalness around the saturated area.

According to an embodiment, the saturated area identification module 403 may recognize the saturated area as a reflector configured to receive light from an artificial source (e.g., a streetlight and a fluorescent light), the sun, or sun light to reflect the same, based on meta data of the original image corresponding to the correction image. The meta data may include a configuration value used when the UDC 420 generates an image in response to light. For example, the configuration value may include a sensitivity value (e.g., an international organization for standardization (ISO) sensitivity value) indicating how sensitive the image sensor is to light, an iris value indicating a size of a lens receiving light, or shutter speed indicating a time during which a lens receives light. The meta data may further include time information indicating when an image is generated, location information indicating where an image is taken, or a brightness value indicating brightness of an image. In certain embodiments, the processor 499 may use time of day and location (GPS coordinates) to determine whether the sun is present at the location at the time of the photograph. Additionally, the processor 499 can also use an illuminance sensor to determine whether the light in a saturated area is from the sun, an artificial light source, or reflected.

The processor 499 may add the meta data into one image file together with an image generated by the UDC 420 and store the same in the memory 488. The saturated area identification module 403 may recognize the saturated area as a reflector (e.g., the cloud in FIG. 7B) when sensitivity identified from the meta data is smaller than a designated first sensitivity value or falls within a designated first sensitivity range. The saturated area identification module 403 may recognize the saturated area as an artificial light source (e.g., the lighting in FIG. 7B) when identified sensitivity is larger than a designated second sensitivity value or falls within a designated second sensitivity range. The second sensitivity value may be the same as or larger than the first sensitivity value. The minimum value of the second sensitivity range may be larger than the maximum value of the first sensitivity range. The first sensitivity value or less and the first sensitivity range may be configured in the UDC 420 for taking pictures outdoors on a sunny day. When taking pictures outdoors on a sunny day, the saturated area in a picture may be less likely to be direct sunlight and relatively more likely to be a reflector such as a cloud. Accordingly, when taking pictures outdoors on a sunny day, the saturated area may be determined as a reflector. The second sensitivity value or more and the second sensitivity range may be configured in the UDC 420 for taking pictures indoors or at night. When taking pictures indoors or at night, a flare (glare) caused by a reflector may be less likely to occur and a flare caused by an indoor artificial light source may be more likely to occur. Accordingly, when taking pictures indoors or at night, the saturated area may be determined as an artificial light source.

The saturated area identification module 403 may recognize a light source as a reflector when brightness identified from the meta data is larger than a designated first brightness value or falls within a designated first brightness range. The saturated area identification module 403 may recognize the light source as an artificial light source when identified brightness is smaller than a designated second brightness value or falls within a designated second brightness range. The second brightness value may be the same as or smaller than the first brightness value. The maximum value of the second brightness range may be smaller than the minimum value of the first brightness range.

According to an embodiment, the processor 499 may recognize a type of a light source by using data received from the light sensor 430 during obtaining an original image from the UDC 420. The processor 499 may add information indicating the identified type of the light source to meta data of the original image and store the same in the memory 488. The saturated area identification module 403 may identify, from the memory 488, the meta data of the original image corresponding to the correction image received from the diffraction correction module 402. The saturated area identification module 403 may determine a type of the saturated area, based on the information indicating the type of the light source recorded in the meta data.

The flare compensation module 404 may receive the correction image from the diffraction correction module 402 through the saturated area identification module 403 and mitigate overcorrection by the diffraction correction module 402 by processing a periphery of the saturated area in the correction image to be blurred. For example, the flare compensation module 404 may restore a portion adjacent to the saturated area of the flare having been removed from the original image.

Referring to FIG. 8A and FIG. 8B, the flare correction module 404 may process the first correction image 710 and the second correction image 720 to obtain a first compensation image 810 and a second compensation image 820. Compared to the first correction image 710, the first compensation image 810 may have a relatively natural-looking periphery 811 of the first saturated area 611 by processing a periphery of the lighting to be blurred. Compared to the first correction image 720, the second compensation image 820 may have a relatively natural-looking periphery 821 of the second saturated area 621 by processing a periphery of the cloud to be blurred.

According to an embodiment, the flare compensation module 404 may include a residual image generation module 520 and a weight map generation module 530.

The residual image generation module 520 may receive a copy of an original image from the image reception module 401, receive a correction image from the diffraction correction module 402 through the saturated area identification module 403, and generate a residual image indicating a difference between the copy and the correction image. The original image may be obtained by integrating the residual image and the correction image into one image.

The weight map generation module 530 may blur the rest of the correction image except for the saturated area in by using a filter and remove the saturated area from the correction image so as to generate a weight map (or a weight map).

Referring to FIG. 9A and FIG. 9B, the weight map generation module 530 may receive an image 910 having a clear boundary 912 between the saturated area 911 and the periphery thereof from the diffraction correction module 402 through the saturated area identification module 403. The weight map generation module 530 may perform blur processing on the image 910 in FIG. 9A by using a filter (e.g., a box filter or a Gaussian filter) to obtain a weight map (or a weight image) 920 in FIG. 9B. The filter may be composed of a n*m matrix and may be referred to as another term (e.g., a window, a kernel, or a mask). The weight map generation module 530 may perform convolution on the filter with each pixel of the image 910 and remove the saturated area 911 from the image 910 to obtain the weight map 920 including the periphery of the saturated area 911.

The flare compensation module 404 may multiply a residual image obtained from the residual image generation module 520 by a weight map obtained from the weight map generation module 530 to obtain a weighted image. The flare compensation module 404 may synthesize the weighted image with the correction image received from the diffraction correction module 402 through the saturated area identification module 403 to obtain a compensation image. The flare compensation module 404 may output the compensation image to the image processing module 405. For example, in the weight map, weight values corresponding to each pixel may have a value between 0 and 1. The weight may have a value closer to 1 as the pixel approaches the saturated area, and closer to 0 as the pixel becomes father from the saturated area. The periphery of the saturated area of the correction image may be restored close to the periphery of the saturated area of the original image by multiplying the weight map by the original image and then synthesizing the image obtained through the multiplication with the correction image.

In case that the saturated area is caused by direct light of a light source (e.g., the lighting in FIG. 7A), the flare may be widely distributed on the periphery of the saturated area. In case that the saturated area is caused by light of a reflector (e.g., the cloud in FIG. 7B), the flare may be relatively narrowly distributed on the periphery of the saturated area. Accordingly, in case that the saturated area is caused by direct light of a light source, a large filter used for generating the weight map may be configured. In case that the saturated area is caused by light of a reflector, a relatively small filter may be configured.

The weight map generation module 530 may determine a size (e.g., a size of a matrix) of the filter based on information indicating a type of a light source. For example, the weight map generation module 530 may receive information indicating a type of a light source together with a correction image from the saturated area identification module 403. In case that the light source is an artificial light source (e.g., the lighting in FIG. 7A), the weight map generation module 530 may generate a compensation image by using a filter having a first size. In case that the light source is a reflector (e.g., the cloud in FIG. 7B), the weight map generation module 530 may generate a compensation image by using a filter having a second size smaller than the first size.

The image processing module 405 may process the correction image received from the diffraction correction module 402 through the saturated area identification module 403 and the compensation image received from the flare compensation module 404 to be stored in the memory 488 or displayed on the display 410. For example, the image processing module 405 may decrease resolution of an image received from the saturated area identification module 403 or the flare compensation module 404 to be displayed on the display 410. The image processing module 405 may encode a format of an image received from the saturated area identification module 403 or the flare compensation module 404 in a lossy compression format (e.g., YUV and JPEG) to be stored in the memory 488. The image processing module 405 may perform various image processing (e.g., tone mapping and sharpening) in addition to encoding or resolution adjustment.

At least one of the modules 401-405 may be stored in the memory 488 (e.g., the memory 130 in FIG. 1) as instructions and executed by the processor 499 (e.g., the processor 120 in FIG. 1). At least one (e.g., the diffraction correction module 402) of the modules 401-405 may be executed by a processor (e.g., the auxiliary processor 123) specializing in processing an artificial intelligent model. At least one of components of the electronic device 400 may be omitted from the electronic device 400 and may be implemented in an external device (e.g., the server 108 in FIG. 1) instead. For example, the correction model 510 may be included in an external device. The processor 499 may transmit an input value (e.g., an original image generated from the UDC 420) to be input to the correction model implemented in an external device to the external device through a wireless communication circuit (e.g., the wireless communication module 192 in FIG. 1). The processor 499 may receive a result value of the correction model from the external device through the wireless communication circuit and obtain a correction image from the result value.

Figure 10:
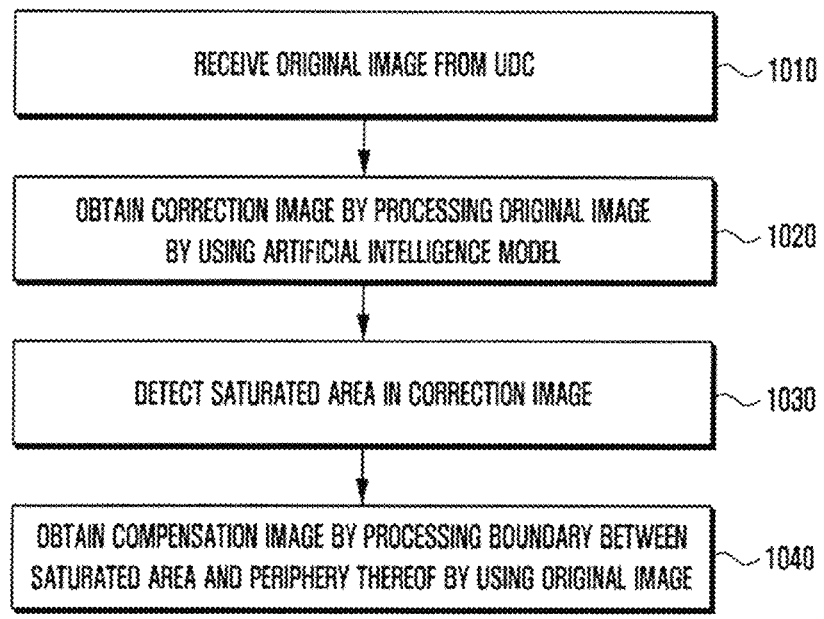
FIG. 10 is a flowchart illustrating operations of a processor according to an embodiment.

FIG. 10 is a flowchart illustrating operations of a processor 499 according to an embodiment.

In an operation 1010, the processor 499 may obtain an original image from the UDC 420.

In an operation 1020, the processor 499 may input the original image as an input value to an artificial intelligence model (e.g., the correction model 510 in FIG. 5) trained for improving picture quality, and obtain a correction image (e.g., the first correction image 710 in FIG. 7A or the second correction image 720 in FIG. 7B) from a result value output from the artificial intelligence model.

In an operation 1030, the processor 499 may detect a saturated area in which a light source exists from the correction image.

In an operation 1040, the processor 499 may obtain a compensation image by processing a boundary between the saturated area and the periphery thereof to be blurred by using the original image.

Figure 11:
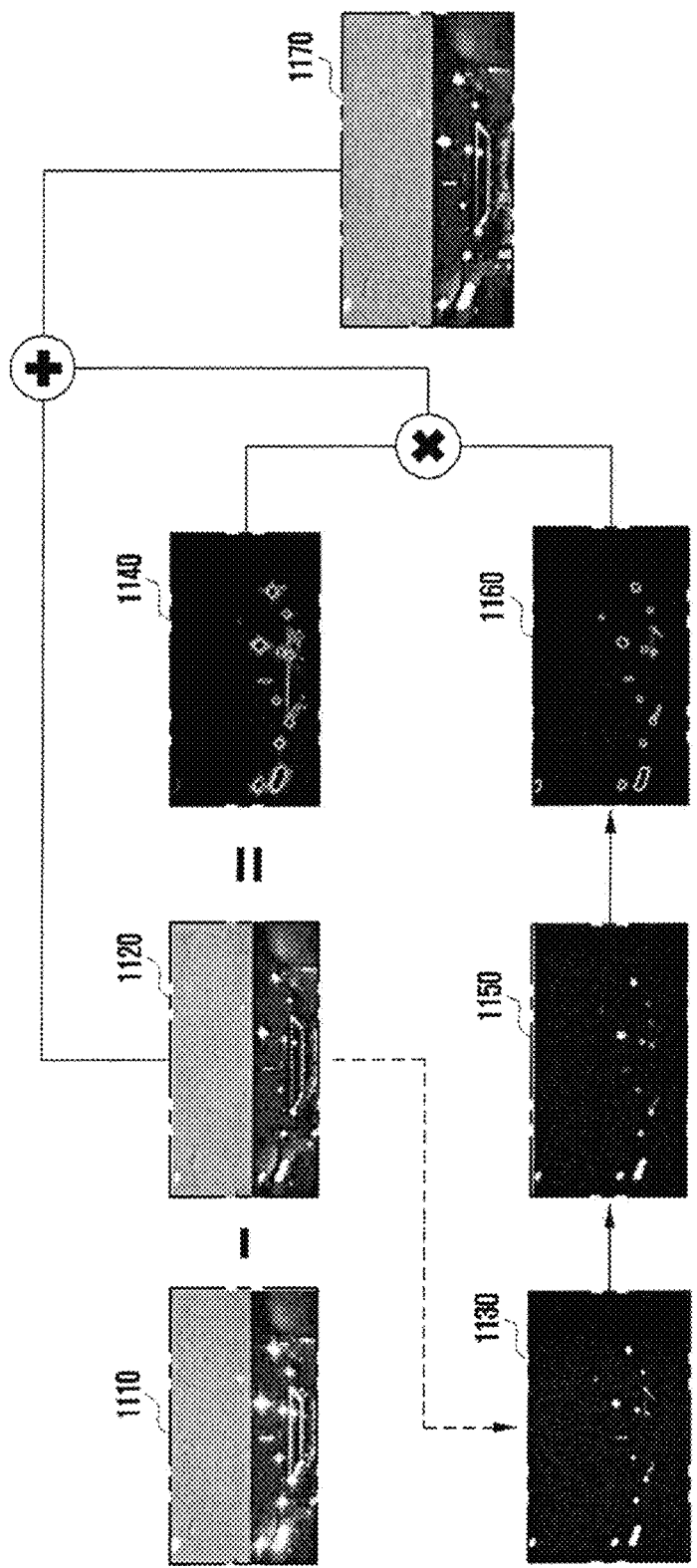
FIG. 11 is a view illustrating an image processing procedure by modules in FIG. 4 according to an embodiment.

FIG. 11 is a view illustrating an image processing procedure by modules 402-404 in FIG. 4 according to an embodiment.

Referring to FIG. 11, the diffraction correction module 402 may process a first image 1110 to generate a second image 1120 in which a flare caused by diffraction phenomenon is corrected. The saturated area identification module 403 may identify a saturated area in which a light source exists from the second image 1120 and generate a third image 1130 in which the identified saturated area is emphasized. For example, assuming that a RGB value range of a pixel is 0-255, the saturated area identification module 403 may generate the third image 1130 in which a difference in brightness between the saturated area and the rest area is contrasted by giving a value of 255 (white) to the saturated area and a value of 0 (black) to the rest area. The residual image generation module 520 of the flare compensation module 404 may generate a fourth image 1140 indicating a difference between the first image 1110 and the second image 1120. The weight map generation module 530 of the flare compensation module 404 may obtain a fifth image 1150 by blurring the rest area of the third image 1130 by using a filter and obtain a sixth image 1160 by removing the saturated area from the fifth image 1150. The flare compensation module 404 may obtain a weighted image by multiplying the fourth image 1140 by the sixth image 1160. The flare compensation module 404 may obtain a seventh image 1170 by synthesizing the weighted image with the second image 1120. The flare compensation module 404 may output the seventh image 1170 to the image processing module 405.

In certain embodiments, an electronic device (e.g., the electronic device 400 in FIG. 4) may include: a camera; a display positioned between an object to be photographed by the camera and the camera; a processor connected to the camera and the display; and a memory operatively connected to the processor, wherein the memory stores instructions, when executed, that cause the processor (e.g., the processor 499 in FIG. 4), to receive an original image from the camera, to input the original image as an input value to an artificial intelligence model trained for improving image quality, to obtain a correction image from a result value output from the artificial intelligent model, to detect a saturated area in which a light source is depicted in the correction image, and to obtain a compensation image by blurring a boundary between the saturated area and a periphery thereof in the correction image by using the original image.

The instructions may cause the processor, as at least a portion of the operation of obtaining the compensation image, to obtain a residual image indicating a difference between the original image and the correction image, to obtain a weight map by processing a boundary between the saturated area and a periphery thereof to be blurred in the correction image by using a filter and removing the saturated area from the correction image, to obtain a weighted image by multiplying the residual image by the weight map, and to obtain the compensation image by synthesizing the weighted image with the correction image. The filter may include a Gaussian filter.

The instructions may cause the processor to identify a type of a light source depicted in the saturated area by using meta data of the original image and to determine a size of the filter, based on the identified type.

The electronic device may further include a light sensor, wherein the instructions may cause the processor to identify a type of a light source by using data received from the light sensor while the camera generates the original image, to add information indicating the identified type to the meta data, and to store the meta data with the information in the memory.

The instructions may cause the processor to identify information indicating camera sensitivity used for generating the original image by the camera from the meta data and to identify a type of a light source depicted in the saturated area based on the information indicating camera sensitivity.

The instructions may cause the processor to identify the light source depicted in the saturated area as a reflector reflecting sun light in case that the sensitivity is included in a first sensitivity range and to identify the light source depicted in the saturated area as an artificial light source in case that the sensitivity is included in a second sensitivity range, wherein a minimum value of the second sensitivity range is larger than a maximum value of the first sensitivity range.

The instructions may cause the processor to identify information indicating brightness of the original image from the meta data and to identify a type of a light source depicted in the saturated area based on the information indicating brightness.

The instructions may cause the processor to identify the light source depicted in the saturated area as a reflector reflecting sun light in case that the brightness is included in a first brightness range and to identify the light source depicted in the saturated area as an artificial light source in case that the brightness is included in a second brightness range, wherein a maximum value of the second brightness range is smaller than a minimum value of the first brightness range.

The instructions may cause the processor to determine the filter to have a first size in case that the light source depicted in the saturated area is identified as an artificial light source and to determine the filter to have a second size smaller than the first size in case that the light source of the saturated area is identified as a reflector reflecting sun light.

The instructions may cause the processor to determine an area where brightness reaches a designated maximum as the saturated area from the correction image.

In certain embodiments, an electronic device includes: a camera; and a display positioned between an object to be photographed by the camera and the camera. A method for operating the electronic device may include: an operation of receiving an original image from the camera (e.g., the operation 1010 in FIG. 10); an operation of inputting the original image as an input value to an artificial intelligence model trained for improving image quality and obtaining a correction image from a result value output from the artificial intelligence model (e.g., the operation 1020); an operation of detecting a saturated area where a light source is depicted in the correction image (e.g., the operation 1030); and an operation of obtaining a compensation image by blurring a boundary between the saturated area and a periphery thereof in the correction image by using the original image (e.g., the operation 1040).

The operation of obtaining the compensation image may include: an operation of obtaining a residual image indicating a difference between the original image and the correction image; an operation of obtaining a weight map by processing a boundary between the saturated area and a periphery thereof to be blurred in the correction image by using a filter and by removing the saturated area from the correction image; an operation of obtaining a weighted image by multiplying the residual image by the weight map; and an operation of obtaining the compensation image by synthesizing the weighted image with the correction image.

The method may include: an operation of identifying a type of a light source depicted in the saturated area by using meta data of the original image; and an operation of determining a size of the filter, based on the identified type.

The method may include: an operation of identifying a type of a light source by using data received from a light sensor of the electronic device while the camera generates the original image; and an operation of adding information indicating the identified type to the meta data to be stored in the memory of the electronic device.

The operation of identifying a type of a light source may include: an operation of identifying information indicating camera sensitivity used for generating the original image by the camera from the meta data; and an operation of identifying a type of a light source depicted in the saturated area based on the information indicating sensitivity.

The operation of identifying a type of a light source may include: an operation of identifying the light source depicted in the saturated area as a reflector reflecting sun light in case that the sensitivity is included in a first sensitivity range; and an operation of identifying the light source depicted in the saturated area as an artificial light source in case that the sensitivity is included in a second sensitivity, wherein a minimum value of the second sensitivity range is larger than a maximum value of the first sensitivity range.

The operation of identifying a type of a light source may include: an operation of identifying information indicating brightness of the original image from the meta data; and an operation of identifying a type of a light source depicted in the saturated area based on the information indicating brightness.

The operation of identifying a type of a light source may include: an operation of identifying the light source depicted in the saturated area as a reflector reflecting sun light in case that the brightness is included in a first brightness range; and an operation of identifying the light source depicted in the saturated area as an artificial light source in case that the brightness is included in a second brightness range, wherein a maximum value of the second brightness range is smaller than a minimum value of the first brightness range.

The operation of determining a size of the filter may include: an operation of determining the filter to have a first size in case that the light source of the saturated area is identified as an artificial light source; and an operation of determining the filter to have a second size smaller than the first size in case that the light source of the saturated area is identified as a reflector reflecting sun light.

The embodiments disclosed in the specification and the drawings are merely presented as specific examples to easily explain the technical features according to the embodiments of the disclosure and help understanding of the embodiments of the disclosure and are not intended to limit the scope of the embodiments of the disclosure. Therefore, the scope of the certain embodiments disclosed herein should be construed as encompassing all changes or modifications derived from the technical ideas of the certain embodiments disclosed herein in addition to the embodiments disclosed herein.

What is claimed is:

1. An electronic device comprising:
   a camera;
   a display positioned between an object to be photographed by the camera and the camera;
   a processor connected to the camera and the display; and
   a memory operatively connected to the processor, wherein the memory stores instructions that, when executed, cause the processor to:
   receive an original image from the camera;
   input the original image as an input value to an artificial intelligence model trained for improving image quality, and obtain a correction image from a result value output from the artificial intelligent model;
   detect a saturated area in which a light source is depicted in the correction image; and
   obtain a compensation image by blurring a boundary between the saturated area and a periphery thereof in the correction image by using the original image.

2. The electronic device of claim 1, wherein the instructions cause the processor, as at least a portion of the obtaining a compensation image, to:
   obtain a residual image indicating a difference between the original image and the correction image;
   obtain a weight map by processing a boundary between the saturated area and a periphery thereof to be blurred in the correction image by using a filter and by removing the saturated area from the correction image;
   obtain a weighted image by multiplying the residual image by the weight map; and
   obtain the compensation image by synthesizing the weighted image with the correction image.

3. The electronic device of claim 2, wherein the filter comprises a Gaussian filter.

4. The electronic device of claim 2, wherein the instructions cause the processor to:
   identify a type of a light source depicted in the saturated area by using meta data of the original image; and
   determine a size of the filter, based on the identified type.

5. The electronic device of claim 4 further comprising a light sensor, wherein the instructions cause the processor to:
   identify a type of a light source by using data received from the light sensor while the camera generates the original image; and
   add information indicating the identified type to the meta data; and
   store the meta data with the information in the memory.

6. The electronic device of claim 4, wherein the instructions cause the processor to:
   identify information indicating camera sensitivity used for generating the original image by the camera from the meta data; and
   identify a type of a light source depicted in the saturated area, based on the information indicating camera sensitivity.

7. The electronic device of claim 6, wherein the instructions cause the processor to:
   identify the light source depicted in the saturated area as a reflector reflecting sun light in case that the sensitivity is included in a first sensitivity range; and
   identify the light source depicted in the saturated area as an artificial light source in case that the sensitivity is included in a second sensitivity range, and
   wherein a minimum value of the second sensitivity range is larger than a maximum value of the first sensitivity range.

8. The electronic device of claim 4, wherein the instructions cause the processor to:
   identify information indicating brightness of the original image from the meta data; and
   identify a type of a light source depicted in the saturated area, based on the information indicating brightness.

9. The electronic device of claim 8, wherein the instructions cause the processor to:
   identify the light source depicted in the saturated area as a reflector reflecting sun light in case that the brightness is included in a first brightness range; and
   identify the light source depicted in the saturated area as an artificial light source in case that the brightness is included in a second brightness range, and
   wherein a maximum value of the second brightness range is smaller than a minimum value of the first brightness range.

10. The electronic device of claim 4, wherein the instructions cause the processor to:
    determine the filter to have a first size in case that the light source depicted in the saturated area is identified as an artificial light source; and
    determine the filter to have a second size smaller than the first size in case that the light source of the saturated area is identified as a reflector reflecting sun light.

11. The electronic device of claim 1, wherein the instructions cause the processor to determine an area where brightness reaches a designated maximum as the saturated area.

12. A method for operating an electronic device comprising a camera and a display positioned between an object to be photographed by the camera and the camera, the method comprising:
    receiving an original image from the camera;
    inputting the original image as an input value to an artificial intelligence model trained for improving image quality and obtaining a correction image from a result value output from the artificial intelligence model;
    detecting a saturated area where a light source is depicted in the correction image; and
    obtaining a compensation image by blurring a boundary between the saturated area and a periphery thereof in the correction image by using the original image.

13. The method of claim 12, wherein the obtaining a compensation image comprises:
    obtaining a residual image indicating a difference between the original image and the correction image;
    obtaining a weight map by processing a boundary between the saturated area and a periphery thereof to be blurred in the correction image by using a filter and by removing the saturated area from the correction image;
    obtaining a weighted image by multiplying the residual image by the weight map; and
    obtaining the compensation image by synthesizing the weighted image with the correction image.

14. The method of claim 13, comprising:
identifying a type of a light source depicted in the saturated area by using meta data of the original image; and
determining a size of the filter, based on the identified type.

15. The method of claim 14, comprising:
identifying a type of a light source by using data received from a light sensor of the electronic device while the camera generates the original image; and
adding information indicating the identified type to the meta data to be stored in the memory of the electronic device.

16. The method of claim 14, wherein the identifying a type of a light source comprises:
identifying information indicating camera sensitivity used for generating the original image by the camera from the meta data; and
identifying a type of a light source existing in the saturated area, based on the information indicating sensitivity.

17. The method of claim 16, wherein the identifying a type of a light source comprises:
identifying the light source depicted in the saturated area as a reflector reflecting sun light in case that the sensitivity is included in a first sensitivity range; and
identifying the light source of the saturated area as an artificial light source in case that the sensitivity is included in a second sensitivity, and
wherein a minimum value of the second sensitivity range is larger than a maximum value of the first sensitivity range.

18. The method of claim 14, wherein the identifying a type of a light source comprises:
identifying information indicating brightness of the original image from the meta data; and
identifying a type of a light source depicted in the saturated area, based on the information indicating brightness.

19. The method of claim 18, wherein the identifying a type of a light source comprises:
identifying the light source depicted in the saturated area as a reflector reflecting sun light in case that the brightness is included in a first brightness range; and
identifying the light source depicted in the saturated area as an artificial light source in case that the brightness is included in a second brightness range, and
wherein a maximum value of the second brightness range is smaller than a minimum value of the first brightness range.

20. The method of claim 14, wherein the determining a size of the filter comprises:
determining the filter to have a first size in case that the light source depicted in the saturated area is identified as an artificial light source; and
determining the filter to have a second size smaller than the first size in case that the light source of the saturated area is identified as a reflector reflecting sun light.

* * * * *